Inventor:
Stafford Trottman

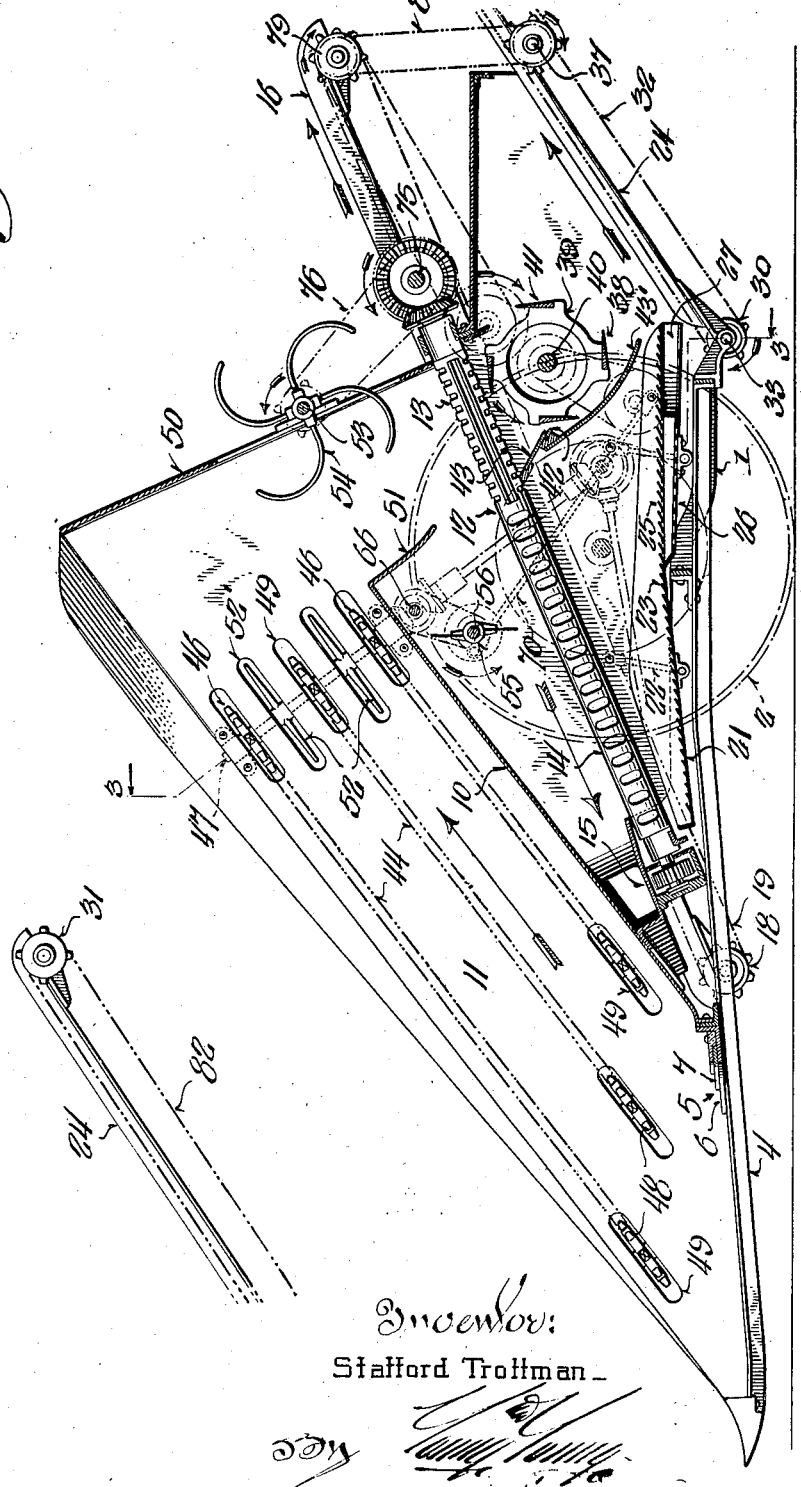

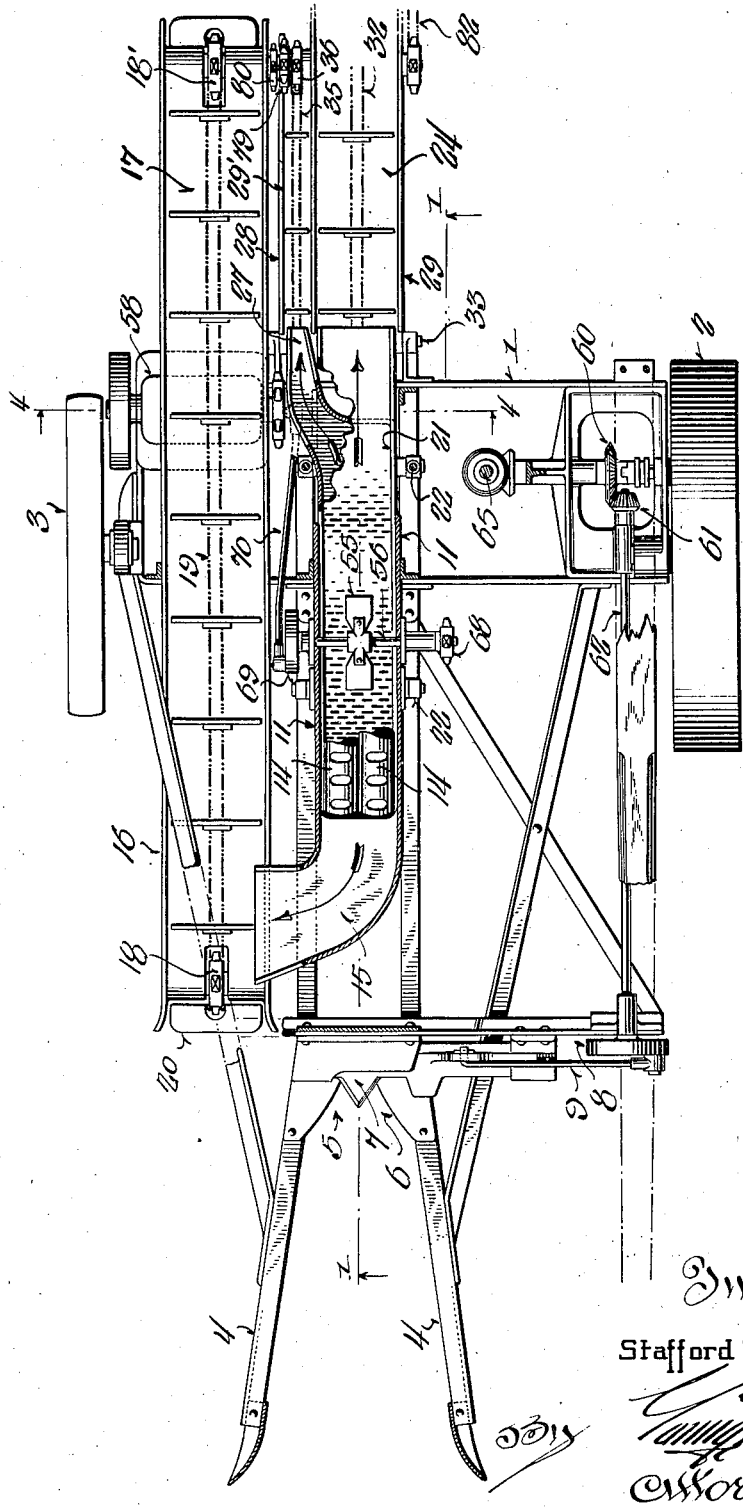

Patented July 30, 1929.

1,722,717

UNITED STATES PATENT OFFICE.

STAFFORD TROTTMAN, OF MILWAUKEE, WISCONSIN, ASSIGNOR, BY MESNE ASSIGNMENTS, TO ROSENTHAL MANUFACTURING COMPANY, OF WEST ALLIS, WISCONSIN.

CORN HARVESTER.

Application filed June 9, 1926. Serial No. 114,694.

This invention pertains to corn huskers.

Heretofore, various attempts have been made to produce a corn husker which, in addition to cutting the stalks in the field, would separate and husk the ears of corn. In general, these machines have discharged the husked or separated ears on the ground, as well as the stalks, and for this reason have proved objectionable and impracticable, as the husked ears had to be collected, which was also true of the stalks where the latter were to be used for fodder or ensilage. This resulted in no advantage over utilizing the conventional corn binder, which merely cut and bound the stalks into bundles, and thereafter collecting and running the stalks through a conventional corn husker. In fact, a disadvantage occurred in that the bound bundles are much more readily and easily collected than the scattered ears of corn.

Further objections resulting from previous attempts along the above line, arose from the fact that two independent sets of rolls were used, one for snapping the ears from the stalks, and one for husking, which resulted in cumbersome, complicated, and heavy structures.

It is, therefore, the primary object of the present invention to overcome the foregoing objections by the provision of a comparatively simple, light, and efficient machine adapted to perform the operation of cutting the standing stalks of corn, separating the ears therefrom, husking the ears, and if desired, cutting the stalks into fodder, and thereafter delivering any one or all of the separated elements to suitable points from which they may be discharged into receptacles or to a trailer carried by the machine, thus eliminating the necessity of individually collecting or gathering up any one of the separated elements.

Another object is to provide a machine of the foregoing character with means for cutting the separated stalks into fodder.

With the above and other objects in view, which will appear as the description proceeds, the invention resides in the novel construction, combination and arrangement of parts substantially as hereinafter described and more particularly defined by the appended claims, it being understood that such changes in the precise embodiment of herein disclosed invention may be made as come within the scope of the claims.

In the accompanying drawing is illustrated one complete example of the physical embodiment of the present invention constructed according to the best mode so far devised for the practical application of the principles thereof.

In the drawings Figure 1 is a longitudinal section through a machine embodying one form of the present invention, the same being taken on line 1—1 of Figures 2 and 3;

Figure 1$^A$ is a fragmentary detail of the rear portion of one of the conveyors.

Figure 2 is a plain view with parts broken away and in section to more clearly illustrate the structural features;

Figure 3 is a transverse section taken on the line 3—3 of Figure 1; and

Figure 4:
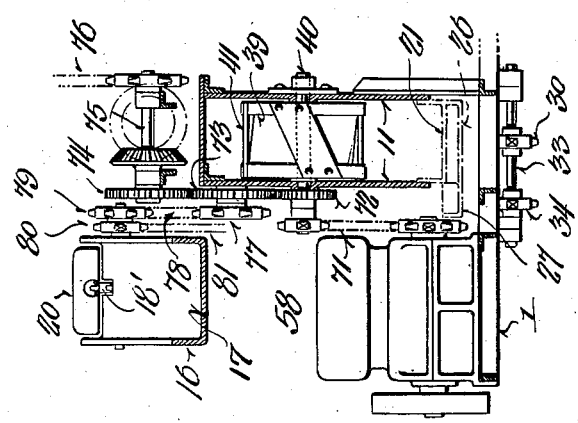
Figure 4 is a similar view on the line 4—4 of Figure 2.
Figure 5:
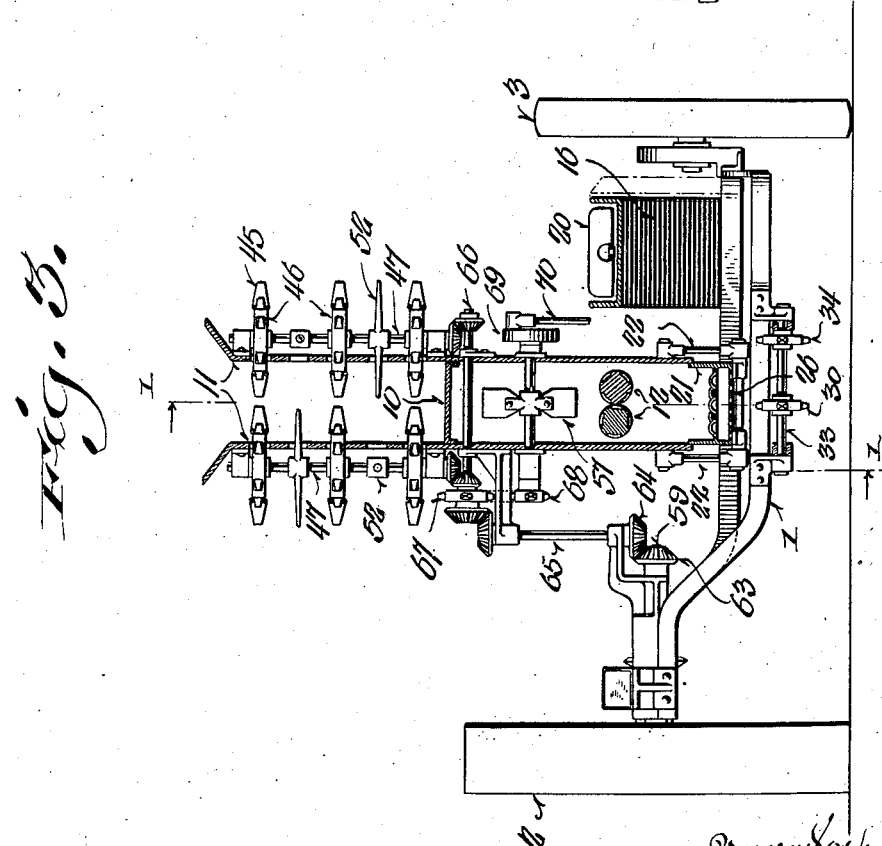

Referring now more particularly to the accompanying drawings, which are merely for illustrative purposes rather than to define a specific structure, the numeral 1 designates a main frame supported at one side by the driving or bull wheel 2, and upon the opposite side by the wheel 3 which may be adjusted with relation to the frame in the usual manner to maintain proper alignment of the machine when working on sloping or hilly ground. Extending forwardly from the main frame 1 are a pair of dividers 4 which straddle the row of corn to be cut, and guide the same to a cutting mechanism 5 carried thereby. This mechanism is of the conventional type used in corn binders and comprises a stationary knife 6 and a reciprocating blade or sickle bar 7, the latter being driven by pitman 8 to which it is connected by the link 9.

Inclined forwardly and rearwardly, from the cutting mechansim 5, is a supporting plate 10 which is positioned between and carried by the sidewalls 11, the plate and walls cooperating to confine and guide the stalks elevated in the manner to be hereinafter described.

Positioned between the sidewalls 11 immediately below the supporting plate 10, and substantially similarly inclined, are a pair of rolls 12, the upper portions 13 forming separating rolls which function to remove the ears of corn from the stalks as the latter are fed thereto, while the lower portion 14 forms the husking rolls which serve to remove the husks from the ears in the usual manner.

Extending over the lower ends of the rolls 12 is an inclined angular shoot 15 which receives the husked ears from the rolls 12, and delivers the same to a conveyor 16, positioned longitudinally of the machine, closely adjacent one of the side walls 11 and inclined upwardly and rearwardly, in order that the husked ears received from the rolls may be carried to a sufficient height from which they are discharged into a suitable receptable carried at the rear of the machine or trailed thereby.

The conveyor 16 is of the usual type employed in corn husking machines, and embodies a trough 17 which carries a pair of sprockets 18 and 18', mounted respectively at the lower and upper ends of the trough, which sprockets serve to carry the chain 19 which is provided with the blades 20.

Positioned below the husking rolls is a shaker trough 21, supported for reciprocative movement upon the links 22. This trough is for the purpose of receiving the husks removed from the ears of corn, as well as such kernels as may become dislodged from the ears during the husking operation. The trough 21 throughout its length is provided with rearwardly inclined fins 23, which, as a result of the reciprocating movement of the trough will gradually cause the husks and kernels to be fed to the rear, where the husks are discharged into a conveyer 24, should it be desired to retain the same for feed purposes. In order to separate the kernels from the husks, that portion of the trough bottom 25 is open between the fins 23, thus permitting the kernels to drop through upon a perforated bottom 26 that separates any sand and dirt from the kernels. An auxiliary shoot 27, extending outwardly and longitudinally adjacent the main trough discharges the kernels into a small conveyer 28 positioned adjacent the conveyer 24, but terminating short thereof, from which point the kernels may be discharged into a bag or other suitable receptable (not shown) suspended below the upper end of the conveyer. The conveyers 28 and 24 are similar in structure to the conveyer 16 and comprise the main trough 29 which serves for the conveyer 24, and the auxiliary trough 29' carried thereby, serves for the conveyor 28. The conveyor 24 carries at its opposite ends sprockets 30 and 31 which carry the chain 32. Mounted on the shaft 33, which carries the lower sprocket 30, is sprocket 34 which carries the chain 35 for the auxiliary conveyor 28. The upper end of the chain 35 is carried by the sprocket 36 mounted on the shaft 37. The drive for the various conveyors will be considered later on.

In instances where it is desired to cut the separated stalks into fodder, it is proposed to utilize a rotary cutter 38, of conventional type, comprising a pair of end members 39 mounted upon a transverse shaft 40. Secured to the members 39 are a plurality of transverse plates 41 which cooperate with the stationary cutter bar 42. As best shown in Figure 1, an inclined apron 43 extending from a point closely adjacent the rolls 12, to the cutter bar 42, serves to guide the stalks, fed through the rolls, to the cutter bar, where they are engaged by the blade 41. An inclined guide 43' extending rearwardly from the cutter bar 42 guides the severed stalks to a point from which they are discharged upon the conveyor 24 and elevated with the husks to be discharged into a suitable receptacle or trailer (not shown).

The mechanism for conveying the stalks from the cutting apparatus 5, is of the conventional type used in corn binders and comprises a plurality of parallel chains 44 which carry fingers 45. The upper ends of the elevating chains are carried on the driven sprockets 46 secured on the vertical shafts 47, while the lower end of the chains pass over idler sprockets 48 carried by the sidewalls 11. Both the driven and idler sprockets are positioned outside the sidewalls 11 and have a portion of their peripheries extending through slots 49 formed in the sidewalls thus bringing the adjacent stretches of the chains 44 inside of the sidewalls. As will be noted in Figure 1 the shafts 47 are positioned in approximate alignment with the upper end of the supporting plate 10 which terminates short of the back wall 50 and has depending therefrom an apron 51 which serves to guide the stalks discharged from the conveyor chains 44.

To facilitate the proper discharge of the stalks from the elevating chains 44 a plurality of wipers 52 are mounted on the shafts 47, the arms of the wiper being adapted to extend through the slots 52' also formed in the sidewalls 11.

Mounted on the driven shaft 53 journaled in bearings secured to the exterior of the rear wall 50, is another wiper 54, the arms of which travel through a slot formed in the rear wall, to assist gravity in feeding the stalks to the separating rolls 13, and thus eliminate any possibility of clogging.

To prevent the separated ears from traveling down the husking rolls at too great a speed, or one above the other, a rotary beater 55 is positioned immediately above the rolls, adjacent their upper ends, on the transverse shaft 56. To avoid bruising or damage to the separated ears, the beater 55 consists of a hub provided with radial arms to which are attached blades 57 formed of leather, rubber or other suitable, flexible material.

In taking up the driving means for the various mechanisms it will be noted that the power for certain parts is taken off the drive wheel in a manner similar to that now employed in standard types of harvesting machines, while other parts are driven by an engine 58 mounted on the main frame 1. However, attention is directed to the fact that the present invention is not to be confined to this specific driving arrangement shown, as it is contemplated that the same way be obtained in various ways to produce the desired operation. It is thought, however, that considerable advantage results through the divided driving arrangement, wherein the cutting mechanism and stalk elevating chains are driven from the traction wheel, which correlates their speed with the progress of the machine, while the conveying mechanism which requires considerable power and speed is taken care of independently by the engine.

In the design illustrated, the drive for the cutting mechanism 5, the elevating chains 44, and the transverse shaft 56 is taken off the drive wheel 2 by means of the shaft 59 geared to the drive wheel in the usual manner employed in corn huskers and indicated by dotted lines in Figure 1. Mounted intermediately on the shaft 59 is a bevel gear 60 meshing with the bevel gear 61 secured to the rear end of the longitudinal shaft 62 which has mounted on its outer end the chain pitman 8 which serves to drive reciprocating cutting blade 7.

As best shown in Figure 3 the inner end of the shaft 59 has secured thereto another bevel gear 63 meshing with a bevel gear 64 mounted on the lower end of the vertical shaft 65, the upper end of which is in bevel gear connection with the transverse shaft 66. The shaft 66 serves to drive the elevating chains 44 through the bevel gear connections with the shafts 47. In addition to driving the vertical shafts 47, the shaft 66 carries a sprocket 67 in chain connection with the sprocket 68 mounted on the transverse shaft 56 that carries the beater 55. On the same shaft 56 is mounted a pitman 69, which through the link 70 oscillates the trough 21.

Inasmuch as considerable power and speed is required to actuate the separating, husking, and shredding mechanism, it is deemed preferable to utilize the engine 58 which, by means of the sprocket chain 71, drives the shaft 40 that carries the cutter head 38. Mounted on the shaft 40, exteriorily of the sidewall 11 is the spur gear 72 meshing with an intermediate gear 73 that engages the gear 74 secured on the transverse shaft 75, which shaft, through a bevel gear connection operates one of the rolls 12, the same being connected with the adjacent roll through spur gears mounted on their lower ends.

To operate the beater 54 shaft 53 is driven by the sprocket chain connection 76 with the shaft 75.

The drive for the various conveyors is primarily taken off the sprocket wheel 77 secured to the intermediate spur gear 73, from which sprocket the chain 78 connects with the sprocket 79 that serves to drive the conveyor chain 19. Mounted on the same shaft with the sprocket 79 is another sprocket 80, which through the chain 81 drives the shaft 37, that directly operates the auxiliary conveyor chain 35, and through the sprocket chain connection 82 operates the conveyor chain 32.

Taking up in detail the operation of the machine heretofore described, it will be apparent that the standing stalks of corn passing between the dividers 4 and sidewalls 11, when the machine is drawn forward, will be severed closely adjacent the ground by the cutting mechanism 5, after which they are conveyed upwardly and rearwardly by the elevating chains 44 which carry the fingers 45. During this operation the stalks are supported at their bottoms by the plates 10. When the stalks have reached the rear end of the supporting plate 10 they are released by the elevating chains 44, and, assisted by the wipers 52 they are discharged into the throat formed between the depending apron at the rear of the supporting plate 10, the sidewalls 11 and rear wall 50. The discharged stalks which are guided in a substantially vertical position are then fed by gravity, assisted by the wipers 54 into the separating rolls 13. As the stalks pass through the rolls the ears are pinched off, and because of the inclination of the rolls and their continuous rotation the ears are caused to travel slowly down over the husking portions 14, during which traverse the husks are removed in the usual manner.

Upon reaching the bottom of the rolls the husked ears enter the inclined angular shoot 15 which discharges them down to one side into the conveyor 16. Thereafter they are elevated by the conveyor to a sufficient height at the rear of the machine to permit their discharge into a receptacle positioned under the conveyor.

As the stripped stalks pass through the rolls 12 they are guided to the cutter bar 42 by the apron 43 and revolving blades 41, which, cooperating with the cutter bar sever the stalks into fodder to be used for ensilage or feed.

From the cutter bar the severed stalks are guided to the conveyor 24 that elevates them to a sufficient height to permit their discharge into a container or receptacle.

The husks stripped from the ears by the rolls 13 drop into the trough 21, together with any kernels that may become dislodged from the ears during the husking operation, and by means of the fins 23 and the rapid oscillating movement of the trough, they are both gradually fed to the rear, where the husks are discharged upon the conveyor, and the kernels having been sifted through the open portion 25 dropped upon the perforated bottom 26, from where they enter the shoot 27 and are discharged upon the conveyor 28 in the manner already described.

From the foregoing explanation considered in connection with the drawings it will be apparent that a comparatively simple, efficient and easily operated machine has been provided, which is capable of performing operations heretofore requiring two and three machines, with the accompanying extra handling of the material. In other words, a single machine has been devised which during its operation in the field performs all the operations desired in connection with the handling of corn.

While the present invention goes into considerable detail in illustrating and describing a cutting mechanism for severing the stalks into fodder, and means for conveying the fodder to a suitable point of discharge, it is desired to emphasize the fact that in some instances it may not be desired to utilize the stalks or husks for feed purposes, in which case the rotary cutter 38 as well as the trough 21 and conveyors 24 and 28 may be eliminated and the material handled thereby merely discharged on the ground. Also under certain conditions it may be found that the quality or character of the corn is such that the amount of kernels dislodged during the husking operation is so negligible as to render it unnecessary to provide for handling of the same. It is, therefore, contemplated that the cutter, trough, and conveyors 24 and 28, may be eliminated without departing from the invention, which as pointed out in the preceding objects, is primarily directed to a harvesting machine for separating and husking corn, and which is adapted to convey and discharge the husked ears into a trailer or receptacle instead of merely discharging the same upon the ground.

I claim:

1. A corn harvester comprising means for cutting the standing stalks, a pair of inclined rolls for separating the ears from the stalks and husking the separated ears, means for conveying the stalks to said rolls, a chute positioned at the lower end of said rolls for receiving the husked ears, and a conveyor for receiving the ears from said chute and elevating the same to a point of discharge.

2. A corn harvester comprising means for cutting the standing stalks, means for separating the ears from the stalk and husking the separated ears, means for conveying the stalks to said separating and husking means, means for conveying the husked ears to an elevated position, a reciprocating perforated trough for receiving the husks and separated kernels, and a conveyor for receiving the husks from said trough and the stalks from said separating means and delivering both to an elevated position.

3. A corn harvester comprising means for cutting the standing stalks, combined snapping and husking rolls inclined downwardly towards said cutting means, means for conveying the stalks to said rolls, a chute positioned at the lower end of said rolls for receiving the husked ears, a conveyor for receiving the ears from said chute and conveying them to an elevated position, and a revoluble beater positioned above said rolls to retard the downward progress of said ears on said rolls and to prevent the positioning of one ear above the other.

4. A corn harvester comprising means for cutting the standing stalks, combined snapping and husking rolls downwardly inclined toward said cutting means, means for conveying the stalks to said rolls, an inclined angular chute for receiving the husked ears from said rolls and delivering them to the side of said rolls, and a conveyor positioned adjacent and parallel to said rolls for conveying the husked ears to an elevated position.

5. A corn harvester comprising means for cutting the standing stalks of corn, combined snapping and husking rolls, inclined downwardly toward the cutting means, means for conveying the stalks to said rolls, an inclined chute for receiving the husked ears from said rolls and delivering the same to one side thereof, means for conveying the ears received from said chute to an elevated position, a revolving beater positioned above said rolls to prevent the downward progress of the ears, positioned one above the other, on said rolls, and means for conveying the husked and separated stalks to an elevated position.

6. A corn harvester, means for cutting the standing stalks, means for separating the ears from the stalks and husking the separated ears, means for conveying the stalks to said separating and husking means, means for receiving said ears from said husking means and conveying them to an elevated position, means for shredding the separated stalks, means for receiving the husks and kernals dislodged from said ears during the husking operation, shaker trough for separating said husks and kernels, means for conveying the separated kernels to elevated position, and means for conveying the shredded stalks to an elevated position.

7. A corn harvester comprising means for cutting the standing stalks of corn, inclined rolls for separating the ears from the stalks and husking said ears, means for conveying the stalks to said rolls, a revolving beater positioned above said rolls to prevent the travel of one ear above another, an inclined chute for receiving the husked ears from said rolls and delivering them to one side thereof, a conveyor positioned adjacent one side of said rolls and parallel thereof for receiving the husked ears from said chute and conveying the same to an elevated position, means for shredding the separated stalks, a reciprocative trough for receiving the husks and kernels dislodged during the husking operation, said trough serving to feed the husks to the rear of the machine and to separate the kernals from said husks, means for receiving the separated kernels from said trough and conveying them to an elevated position, and means for receiving the husks from said trough and the shredded stalks and conveying them to an elevated position.

8. A corn harvester comprising means for cutting the standing stalks of corn, inclined rolls for separating the ears from the stalks and husking the separate ears, means for conveying the stalks to said rolls, a revolving beater positioned above said rolls to prevent the travel of ears positioned one upon the other on said rolls, said beater comprising a hub provided with radial flexible blades, and means for conveying the husked ears to an elevated position.

9. A corn harvester comprising means for cutting the standing stalks, means for separating the ears from the stalks, and husking the separated ears, means for conveying the stalks to said separating and husking means, means for conveying the husked ears to an elevated position, means for driving the cutting and elevating means from the traction of the harvester, and independent means carried by the harvester for driving the separating and husking means.

10. A corn harvester comprising means for cutting the standing stalks, means for separating the ears from the stalks and husking the separated ears, means for conveying the stalks to said separating and husking means, means for conveying the husked ears to an elevated position, means for shredding the stalks, traction means for driving the cutting and elevating means, and a motor carried by the harvester for driving the separating, husking, and shredding means.

11. A corn harvester comprising means for cutting the standing stalks, means for separating the ears from the stalks and husking the separated ears, means for conveying the stalks to the separating and husking means, means for conveying the husked ears to an elevated position, means for shredding the separated stalks, means for conveying the shredded stalks to an elevated position, traction means for driving the cutting and elevating means, and a motor carried by the harvester for driving the separating, husking, and shredding means and the conveyors for elevating the husked ears and shredded stalks.

12. A corn harvester comprising means for cutting the standing stalks, a pair of inclined rolls adapted at their upper ends to separate ears of corn from the stalks and at their lower ends to husk said ears, means for conveying the stalks to the upper ends of said rolls, means positioned over the lower ends of said rolls to support said stalks as they are conveyed to the upper ends of said rolls and to prevent the stalks from coming into contact with the husking portion of said rolls.

13. A corn husker comprising means for cutting the standing stalks, a pair of rolls for separating the ears from the stalk and husking said ears, means for conveying the stalks to said rolls, a conveyor for elevating the husked ears, and a chute extending over the lower ends of said rolls for receiving ears therefrom and delivering them to said conveyor.

14. A corn husker comprising means for cutting the standing stalks, a pair of rolls for separating the ears from the stalks and husking said ears, means for conveying the stalks to said rolls, a conveyor for elevating the husked ears, an inclined elbow chute extending over the lower ends of said rolls for receiving ears therefrom and delivering them laterally to said conveyor.

15. A corn harvester comprising means for cutting the standing stalks, a pair of inclined rolls for separating the ears from the stalks and husking the separated ears, gears connecting the lower ends of said rolls, a conveyor for elevating the husked ears, and means extending over the lower ends of said rolls and gears for receiving ears from the rolls and delivering them to said conveyor.

16. A corn harvester comprising means for cutting standing stalks, combined snapping and husking rolls inclined downwardly towards said cutting means, means positioned above and parallel to said rolls for conveying stalks to their upper ends, a conveyor positioned adjacent and parallel to said rolls, means for receiving ears from said rolls and delivering the same to said conveyor, a reciprocating trough positioned below said rolls and parallel thereto, and a rearwardly extending conveyor mounted in alinement with said trough for receiving material therefrom.

17. A corn harvester comprising means for cutting standing stalks, combined snapping and husking rolls inclined downwardly towards said cutting means, means positioned above and parallel to said rolls for conveying stalks to their upper ends, a conveyor positioned adjacent and parallel to said rolls, means for receiving ears from said rolls and delivering the same to said conveyor, a reciprocating trough positioned below said rolls and parallel thereto, a rearwardly extending conveyor mounted in alinement with said trough for receiving material therefrom, means carried by said trough for delivering the separated kernels to one side thereof, and a rearwardly extending conveyor for receiving the separated kernels from said trough.

18. A corn harvester comprising means for cutting the standing stalks, means for separating the ears from the stalks and husking the separated ears, means for conveying the stalks to such separating and husking means, means for conveying the husked ears to an elevated position, a reciprocating perforated trough for receiving the husks and separated kernels, a conveyor for receiving the husks from said trough and the stalks from said separating means and delivering both to an elevated position, means carried by said trough for separating loose kernels and dirt from the husks, and means for conveying the separated kernels to an elevated position.

19. A corn harvester comprising means for cutting the standing stalks, a pair of inclined rolls for separating the ears from the stalks and husking said ears, means for conveying the stalks to said rolls, and a cutter positioned below and closely adjacent to the top end of said rolls for cutting the stalks while held by the same.

20. A corn harvester comprising means for cutting the standing stalks, a pair of rolls for separating the ears from the stalks and husking said ears, gathering chains for conveying the stalks to said rolls, and beaters associated with the gathering means for delivering the stalks therefrom to said rolls.

In testimony that I claim the foregoing I have hereunto set my hand at Milwaukee, in the county of Milwaukee and State of Wisconsin.

STAFFORD TROTTMAN.